A. C. BOTH.
HAY AND STRAW CUTTER.
No. 103,552. Patented May 31, 1870.
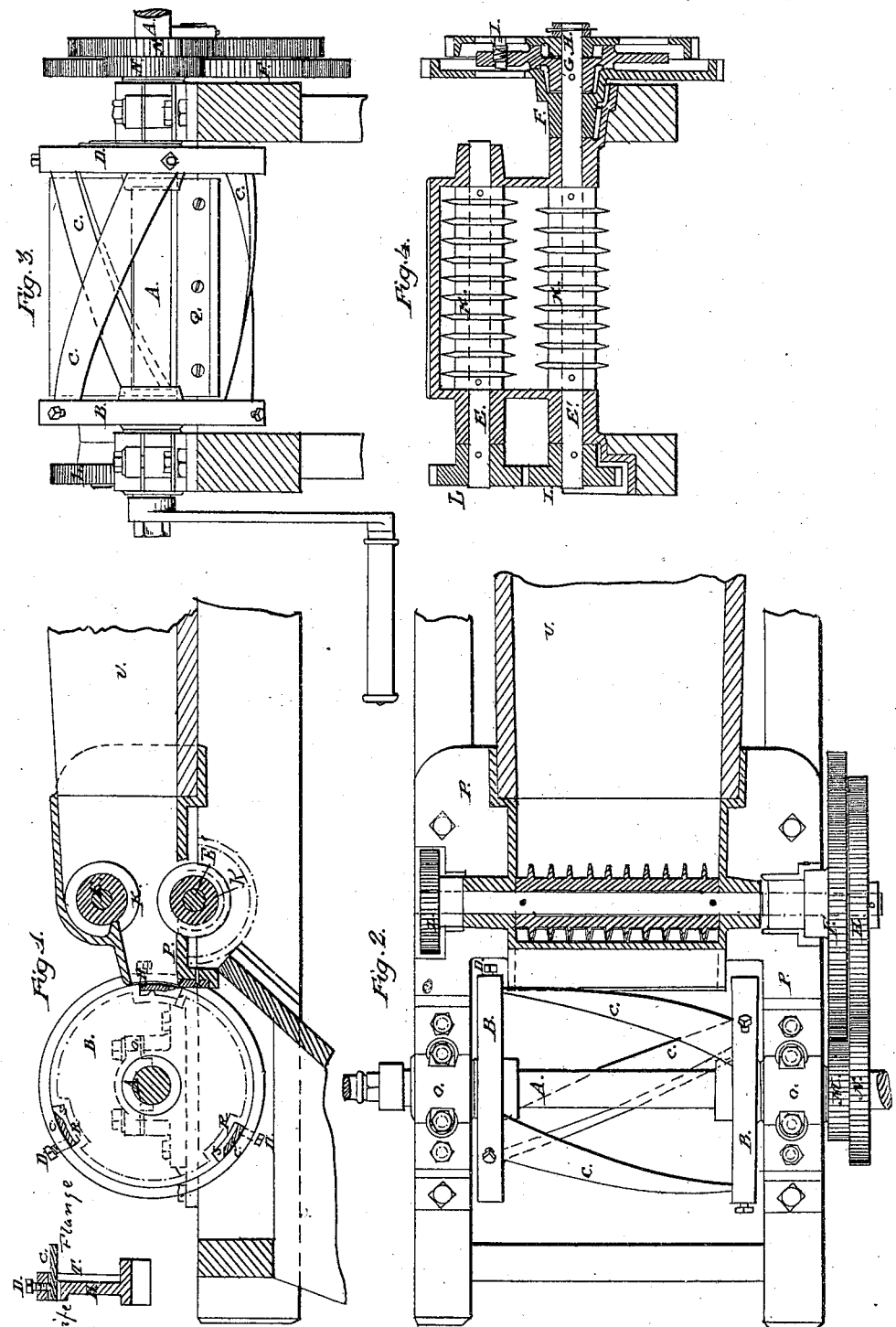

United States Patent Office.

ADOLF C. BOTH, OF HESSE CASSEL, GERMANY.

Letters Patent No. 103,552, dated May 31, 1870.

IMPROVED HAY AND STRAW-CUTTER.

The Schedule referred to in these Letters Patent and making part of the same.

*To all whom it may concern:*

Be it known that I, ADOLF C. BOTH, of Hesse Cassel, Germany, have invented a new and useful "Improvement in Hay and Straw-Cutters;" and I do hereby declare that the following is a full, clear, and exact description of the construction and operation of the same, reference being had to the accompanying drawing and to the letters of reference marked thereon.

The first part of my invention relates to the method of constructing and arranging the knives of the machine, which are so attached to two revolving heads that they may be readily removed for the purpose of grinding them, and replaced in proper position, without requiring any particular skill on the part of the operator, either in grinding or adjusting them.

The second part of my invention relates to the manner of constructing the feed-box, and the feeding-roller contained therein.

The feed-passage of the said box is so arranged that it compresses the hay or straw so as to form a solid mass for the knives to act on; and the feed-rollers are provided with a series of annular projections, the edges of which are serrated in such a manner as to prevent the slipping of the twigs.

The latter part of my invention relates to the gearing of the machine, which is so arranged that it can be regulated for different rates of speed, without removing or changing any of the wheels.

Figure 1 is a longitudinal section through a portion of the machine, showing the arrangement for securing the knives.

Figure 2 is a plan view of the machine, with a horizontal section through the upper feed-roller.

Figure 3 is an end view of the machine.

Figure 4 is a vertical section through the feed-rollers, showing the arrangement of the gearing.

To enable those skilled in the art to make and use my invention, I will now proceed to describe its construction and operation.

The revolving-heads B B, which are made circular in form, and are secured to the shaft A, have each a series of recesses, S S, formed in them, in which are clamped the spiral knives C C.

The said heads are also made with a rim, which projects a short distance on each side, and forms a shoulder, T, against which the flat side of the knives will rest when they are passed through the recesses S S.

In each of the recesses or slots S S is formed a lug, R, on which the opposite side of the knives will rest, and the set-screws D, used in securing the knives, are placed a short distance back of each lug, so that, when they are screwed down, they will bear on the knives, and throw the cutting-edge up, and cause it to bear against the inner edge of the shoulder T, while the back of the knife is pressed down sufficiently to give it a clearance.

The knives C C are curved, and ground on one side, so as to form a part of a cylinder whose diameter is equal to that of the inside edge of the shoulder T, and, owing to their being attached to the revolving-heads in a spiral direction, they will act as shears in cutting the hay or straw.

When the knives are once placed in position, and their outer faces ground to the proper cylindrical shape, it is not necessary in regrinding them to touch this part, as the lower and beveled edge will only require sharpening.

The feed-box P is made in one piece, with projections on the sides for securing it to the frame of the machine; these projections extend toward the front part of the machine, and have secured on them two pedestals O O, for supporting the shaft A.

Passing through the sides of the said box, and working in suitable bearings formed thereon, are two shafts E and E', on which are placed two feeding-roller K and K. These rollers are provided with a series of annular projections which pass a certain distance through the hay or straw, and are serrated on their edges, so as to catch in and prevent any slipping of the twigs.

The upper part of the feed-passage of the feed-box, between the rollers K and K' and the knives C C, is made somewhat tapering, so as to more effectually compress the hay or straw as it is fed continuously in the machine, and form a solid mass for the knives to act on.

The lower shaft E' has placed loosely on it two spur-wheels F and H. Between the said wheels, and keyed fast to the shaft, is a flange, G, provided with a screw, I, for connecting either of the wheels with it.

These wheels are made of different diameters, and gear with two pinions M and N on the shaft A, so that either a slow or fast speed can be communicated to the feed-rollers by merely adjusting the screw I, in the same manner as the back gear of an ordinary lathe.

On the opposite ends of the shafts E and E' are placed two pinions L and L', of the same size, which communicate the same rate of speed from the lower to the upper shaft.

Having thus described my invention, its construction and operation,

What I claim, and desire to secure by Letters Patent, is—

The combination and arrangement of the revolving-heads B and B, slots S S, shoulders T, lugs R, set-screws D, spiral-knives C C, feed-rollers K and K', spur-wheels F and H, flange G, screw I, pinions L and L', and feed-box P, operating as and for the purpose specified.

In testimony whereof I have hereunto signed my name in the presence of two subscribing witnesses.

ADOLF C. BOTH.

Witnesses:
ISAAC R. OAKFORD,
FRANK STOUT.